(12) United States Patent
Lin et al.

(10) Patent No.: US 8,116,686 B2
(45) Date of Patent: Feb. 14, 2012

(54) INSTANT MESSAGE AUDIO CONNECTION MANAGEMENT SYSTEM AND METHOD

(75) Inventors: Chih-Hsiang Lin, Taipei (TW); Alexander I-Chi Lai, Taipei (TW); Chao-Kuang Yang, Taipei (TW); Ya-Wen Lin, Taipei (TW)

(73) Assignee: Acer Incorporated, Taipei Hsien (TW)

( * ) Notice: Subject to any disclaimer, the term of this patent is extended or adjusted under 35 U.S.C. 154(b) by 1448 days.

(21) Appl. No.: 11/616,362

(22) Filed: Dec. 27, 2006

(65) Prior Publication Data

US 2007/0155326 A1    Jul. 5, 2007

(30) Foreign Application Priority Data

Dec. 30, 2005    (TW) .............................. 94147666 A

(51) Int. Cl.
*H04B 7/00* (2006.01)
*H04M 3/16* (2006.01)
*H04M 1/663* (2006.01)
*H04M 1/00* (2006.01)
*H04M 3/00* (2006.01)

(52) U.S. Cl. .............. 455/41.3; 455/411; 455/412.2; 455/420; 455/466; 455/556.1

(58) Field of Classification Search ........... 455/41.2, 455/420, 411, 412.2, 41.3, 466, 556.1
See application file for complete search history.

(56) References Cited

U.S. PATENT DOCUMENTS

| | | | | |
|---|---|---|---|---|
| 6,763,226 B1 * | 7/2004 | McZeal, Jr. | ............. | 455/90.2 |
| 7,031,665 B1 * | 4/2006 | Trell | ............. | 455/70 |
| 7,418,277 B2 * | 8/2008 | Tsai | ............. | 455/569.2 |
| 7,649,522 B2 * | 1/2010 | Chen et al. | ............. | 345/156 |
| 8,005,057 B2 * | 8/2011 | Lim | ............. | 370/338 |
| 2005/0010417 A1 * | 1/2005 | Holmes | ............. | 704/275 |
| 2005/0273609 A1 * | 12/2005 | Eronen | ............. | 713/171 |
| 2006/0031339 A1 * | 2/2006 | Peters | ............. | 709/206 |
| 2006/0083208 A1 * | 4/2006 | Lin | ............. | 370/338 |
| 2006/0094402 A1 * | 5/2006 | Kim | ............. | 455/411 |
| 2006/0229110 A1 * | 10/2006 | Tsai | ............. | 455/569.2 |
| 2007/0003029 A1 * | 1/2007 | Vesterinen | ............. | 379/88.14 |
| 2007/0036137 A1 * | 2/2007 | Horner et al. | ............. | 370/352 |
| 2007/0080934 A1 * | 4/2007 | Chen et al. | ............. | 345/156 |
| 2007/0127704 A1 * | 6/2007 | Marti et al. | ............. | 379/373.01 |
| 2007/0249383 A1 * | 10/2007 | Wiklof et al. | ............. | 455/522 |
| 2007/0281616 A1 * | 12/2007 | Chen | ............. | 455/41.2 |
| 2007/0286171 A1 * | 12/2007 | Guan | ............. | 370/356 |
| 2007/0299983 A1 * | 12/2007 | Brothers | ............. | 709/231 |
| 2008/0055269 A1 * | 3/2008 | Lemay et al. | ............. | 345/173 |
| 2008/0134052 A1 * | 6/2008 | Davis et al. | ............. | 715/744 |
| 2008/0147407 A1 * | 6/2008 | Da Palma et al. | ............. | 704/260 |
| 2008/0172746 A1 * | 7/2008 | Lotter et al. | ............. | 726/26 |
| 2009/0005011 A1 * | 1/2009 | Christie et al. | ............. | 455/412.2 |
| 2009/0141921 A1 * | 6/2009 | Perkins et al. | ............. | 381/328 |
| 2009/0298428 A1 * | 12/2009 | Shin | ............. | 455/41.2 |
| 2009/0327436 A1 * | 12/2009 | Chen | ............. | 709/206 |
| 2010/0142684 A1 * | 6/2010 | Chang et al. | ............. | 379/88.14 |
| 2010/0174791 A1 * | 7/2010 | Tian et al. | ............. | 709/206 |
| 2010/0235523 A1 * | 9/2010 | Garcia et al. | ............. | 709/228 |
| 2010/0255817 A1 * | 10/2010 | Chen et al. | ............. | 455/412.2 |

\* cited by examiner

*Primary Examiner* — Lisa Hashem

(57) ABSTRACT

An instant message monitoring and controlling system includes an instant message monitoring and controlling module, a user operation interface and a bluetooth module. The instant message monitoring and controlling module is used for monitoring and controlling plural instant message tools. The user operation interface is used for defining a bluetooth device therevia. The bluetooth module automatically searches the pairing codes required for connection with the bluetooth device. When the instant message monitoring and controlling module receives data from the instant message tools, one of the instant message tools is communicated with the bluetooth device.

25 Claims, 2 Drawing Sheets

INSTANT MESSAGE AUDIO CONNECTION MANAGEMENT SYSTEM AND METHOD

FIELD OF THE INVENTION

The present invention relates to an instant message audio connection management system, and more particularly to an instant message audio connection management system for integrating plural instant message tools therewith and dynamically selecting an audio device. The present invention also relates to an instant message audio connection management method.

BACKGROUND OF THE INVENTION

With increasing development and cost-effectiveness of the network technology, instant message software now rapidly gaining in popularity. For example, the well-known instant message software such as MSN Messenger, Skype, Yahoo Messenger and the like becomes the popular instant message tool. Such instant message software usually has a voice chat function. For most users, many different instant message tools are used to execute the voice chat function.

Although many different instant message tools installed in a same computer system provide diversity of executing the voice chat function, there are still some drawbacks. For example, when a remote user sends a chat invitation to a local user, the local user should find out the corresponding instant message tool at first. When the local user is invited to chat, a chat window is displayed on the computer screen. Next, the chat window is used as the foreground window, and then the local user may trigger a confirmation key on the foreground window to have the instant message software execute the voice chat function. That is, the procedure of executing the voice chat function by a specified instant message tool is both complicated and time-consuming.

Moreover, before the voice chat function is executed, the audio device should have been previously defined, which is also troublesome. Typically, there are two approaches of switching the audio device. The first approach defines or switches the audio device via the operation system of the computer. After the audio device is defined or switched, the instant message tools should be rebooted. The second approach defines or switches the audio device via the functional option menu provided by the instant message tools. If a voice chat is proceeding, the procedure of switching the audio device is not permitted. In other words, the voice chat needs to be terminated in order to switch the audio device. Therefore, such an approach is very inconvenient.

As known, the commercial audio devices for voice chat include for example bluetooth earphones, USB phones and the like. Unlike the conventional mobile phone, the instant message tools fail to be directly used with the Bluetooth device to respond the chat invitation or have a chat. In other words, the bluetooth earphones can be used as the general audio devices. After the Bluetooth connection software is executed, the bluetooth earphone is communicated with the computer. Then, the bluetooth earphone is defined or switched as the audio device by the above-mentioned inconvenient approaches.

In views of the above-described disadvantages resulted from the prior art, the applicant keeps on carving unflaggingly to develop an instant message audio connection management system and method according to the present invention through wholehearted experience and research.

SUMMARY OF THE INVENTION

It is an object of the present invention to provide an instant message audio connection management system and method, in which several different instant message tools are integrated into this system, so that the local user can receive the chat invitation from the remote user employing one of these instant message tools.

It is another object of the present invention to provide an instant message audio connection management system and method, in which the audio data can be rerouted between different audio devices, so that the audio device may be switched as required.

It is another object of the present invention to provide an instant message audio connection management system and method, in which the use mode of the bluetooth earphone is introduced into the audio chat use mode, so that the voice chat is accepted or terminated when the multifunction key thereof is activated.

In accordance with an aspect of the present invention, there is provided an instant message monitoring and controlling system. The system includes an instant message monitoring and controlling module, a user operation interface and a bluetooth module. The instant message monitoring and controlling module is used for monitoring and controlling plural instant message tools. The user operation interface is used for defining a bluetooth device therevia. The bluetooth module automatically searches the pairing codes required for connection with the bluetooth device. When the instant message monitoring and controlling module receives data from the instant message tools, one of the instant message tools is communicated with the bluetooth device.

In accordance with another aspect of the present invention, there is provided an instant message monitoring and controlling system. The system includes an instant message monitoring and controlling module for monitoring and controlling plural instant message tools; a user operation interface for defining a first audio device therevia; and an audio screening module for rerouting the audio data from the first audio device to a second audio device when one of the instant message tools is executed to have a voice chat function.

In accordance with another aspect of the present invention, there is provided an instant message monitoring and controlling method. The method comprises steps of monitoring and controlling the data of plural instant message tools; defining a bluetooth device; and searching the pairing codes required for connection with the bluetooth device, wherein one of the instant message tools is communicated with the bluetooth device when the connection is established.

In accordance with another aspect of the present invention, there is provided an instant message monitoring and controlling method. The method comprises steps of monitoring and controlling the statuses of plural instant message tools; switching a first audio device to a second audio device; and rerouting the audio data from the first audio device to the second audio device when one of the instant message tools is executed to have a voice chat function.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

An instant message audio connection management system according to a preferred embodiment of the present invention is illustrated with reference to the schematic functional block diagram of FIG. 1. The instant message audio connection management system 100 of FIG. 1 can be applied to a notebook computer and/or a personal digital assistant (PDA).

Several different instant message tools 112, 114 and 116 are integrated into this system, so that the local user can receive the chat invitation from the remote user employing one of these instant message tools. Moreover, the audio data can be rerouted between different audio devices. Even when the local user is having a chat, the audio device may be switched as required.

The instant message audio connection management system 100 of the present invention further refers to the use mode of the bluetooth earphone, so that the voice chat is accepted or terminated when the multifunction key thereof is activated. As a consequence, the instant message audio connection management system 100 of the present invention is convenient and user-friendly.

Figure 1:
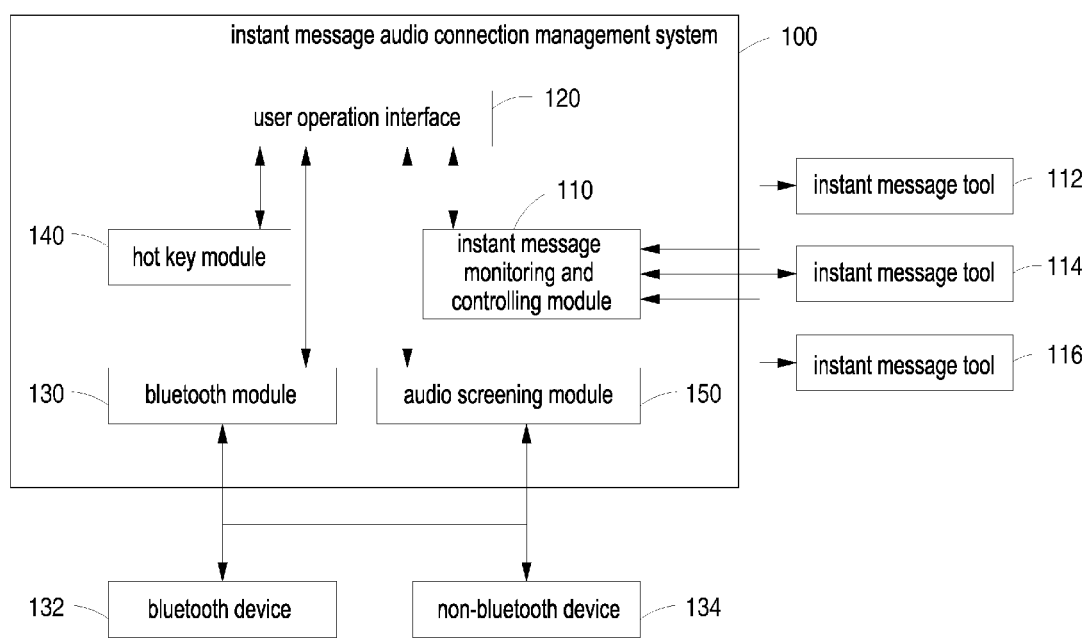
FIG. 1 is a schematic functional block diagram illustrating an instant message audio connection management system according to a preferred embodiment of the present invention.

The instant message audio connection management system 100 of FIG. 1 includes an instant message monitoring and controlling module 110, a user operation interface 120 and a bluetooth module 130. By wired communication networks or wireless communication networks, the instant message monitoring and controlling module 110 is communicated with the instant message tools 112, 114 and 116 in order to monitor and control these instant message tools 112, 114 and 116. An example of the wired communication networks include but are not limited to world wide webs, wide area networks (WANs), local area networks (LANs) or various special lines. Exemplary wireless communication networks include mobile phone networks or wireless local area networks (WLANs). For example, the instant message tools 112, 114 and 116 are MSN Messenger, Yahoo Messenger and Skype, respectively. The instant message monitoring and controlling module 110 is responsible for detecting the packets transmitted by the instant message tools 112, 114 and 116, and discriminating whether someone invites to chat or whether either of the instant message tools 112, 114 and 116 is being used to have a chat with the system 100.

By the instant message monitoring and controlling module 110, the priority order of the instant message tools 112, 114 and 116 is determined. In an embodiment, according to the priority order setting, the instant message tool 112 (e.g. MSN Messenger) has a higher priority than the instant message tool 114 (e.g. Yahoo Messenger) and the instant message tool 114 has a higher priority than the instant message tool 116 (e.g. Skype). When the local user is invited to chat by several chat invitations at the same time, the instant message tool having a higher priority is selected to respond the invitation. For example, in a case that chat invitations are simultaneously received by the instant message tools 112 and 114, the connection management system will respond to the instant message tool 112 according to the priority order setting. Even when the local user is having a chat with the system 100 by the instant message tool 116, the chat will be interrupted and an audio connection between the instant message monitoring and controlling module 110 and another instant message tool having a higher priority (for example the instant message tool 112, e.g. MSN Messenger) will be established.

Via the user operation interface 120 of the system 100, the functions of a bluetooth device 132 and a non-bluetooth device 134 are defined. For example, the bluetooth device 132 is a bluetooth earphone to be defined as a first audio device or a preset audio device. The non-bluetooth device 134 is for example an external speaker and microphone to be defined as a second audio device or an external audio device.

In accordance with a feature of the present invention, the bluetooth module 130 will automatically search a paring code of the bluetooth device 132. Take a bluetooth earphone as the bluetooth device 132 for example. The instant message monitoring and controlling module 110 may actively locate the bluetooth earphone and try to communicate with the bluetooth earphone by searching the paring codes (e.g. 4444, 0000, 1234, etc.) of the general bluetooth earphone. If there is a successful paring, the connection between the instant message monitoring and controlling module 110 and the bluetooth device 132 is established. Under this circumstance, the local user may chat with the remote user by using one of the instant message tools 112, 114 and 116.

Moreover, the instructions issued from the bluetooth device 132 can be transmitted to the instant message monitoring and controlling module 110 through the bluetooth module 130, thereby controlling the audio communication operations of the instant message tools 112, 114 and 116. Examples of the audio communication operations include but are not limited to reception of audio chat invitations, call waiting of audio chats, ending chats, having video chats, and so on. For example, after the bluetooth module 130 successfully searches a pairing code and the connection between the instant message monitoring and controlling module 110 and the bluetooth device 132 is established, the bluetooth device 132 can receive the chat invitation sent from the instant message tool 112 when the multifunction key thereof is activated.

In some embodiments, the system 100 further includes a hot key module 140. By actuating the hot key module 140, an audio device is disabled but another audio device is enabled. For example, via the user operation interface 120, a hot key is defined to implement the functions originally triggered by several individual function keys. In an embodiment, a specified function key on the bluetooth device 132 is a hot key. When the hot key is pressed down, the built-in audio device (not shown) of the system 100 can be switched to the bluetooth device 132. It is noted that, however, those skilled in the art will readily observe that numerous modifications and alterations of the functions of the hot key module may be made while retaining the teachings of the invention. For example, by actuating the hot key module 140, the bluetooth device 132 is switched to the non-bluetooth device 134, or the built-in audio device (not shown) of the system 100 is switched to the non-bluetooth device 134, or the bluetooth device 132 is switched to another bluetooth device (not shown). Accordingly, the above disclosure should be limited only by the bounds of the following claims.

Moreover, the hot key module 140 is also used for controlling the audio communication operations of the instant message tools 112, 114 and 116. Likewise, via the user operation interface 120, a hot key of the hot key module 140 is defined to implement the functions originally triggered by several individual function keys.

In some embodiments, the system 100 further includes an audio screening module 150. For example, the audio screening module 150 is composed of an audio screening proxy (not shown) and an audio screening driver (not shown). When one of the instant message tools 112, 114 and 116 is executed to have a chat with the system 100, an audio device switching instruction may be issued to the system 100 by the user operation interface 120 and the hot key module 140. In response to the audio device switching instruction, the built-in audio device is switched to the external audio device such as the bluetooth device 132 or the non-bluetooth device 134. The specified information issued from the system 100 will be received by the audio screening proxy of the audio screening module 150 and then transmitted to the audio screening driver. Under this circumstance, the audio data will be rerouted from the built-in audio device to the selected audio device such as the bluetooth device 132 or the non-bluetooth device 134. The detailed description of the audio screening module 150 is disclosed in for example a co-pending Taiwanese Patent Application No. 094147667, entitled "Dynamic audio data rerouting system, structure and method", which was filed by the same assignee of the present application on Dec. 30, 2005, and the contents of which are hereby incorporated by reference.

Figure 2:
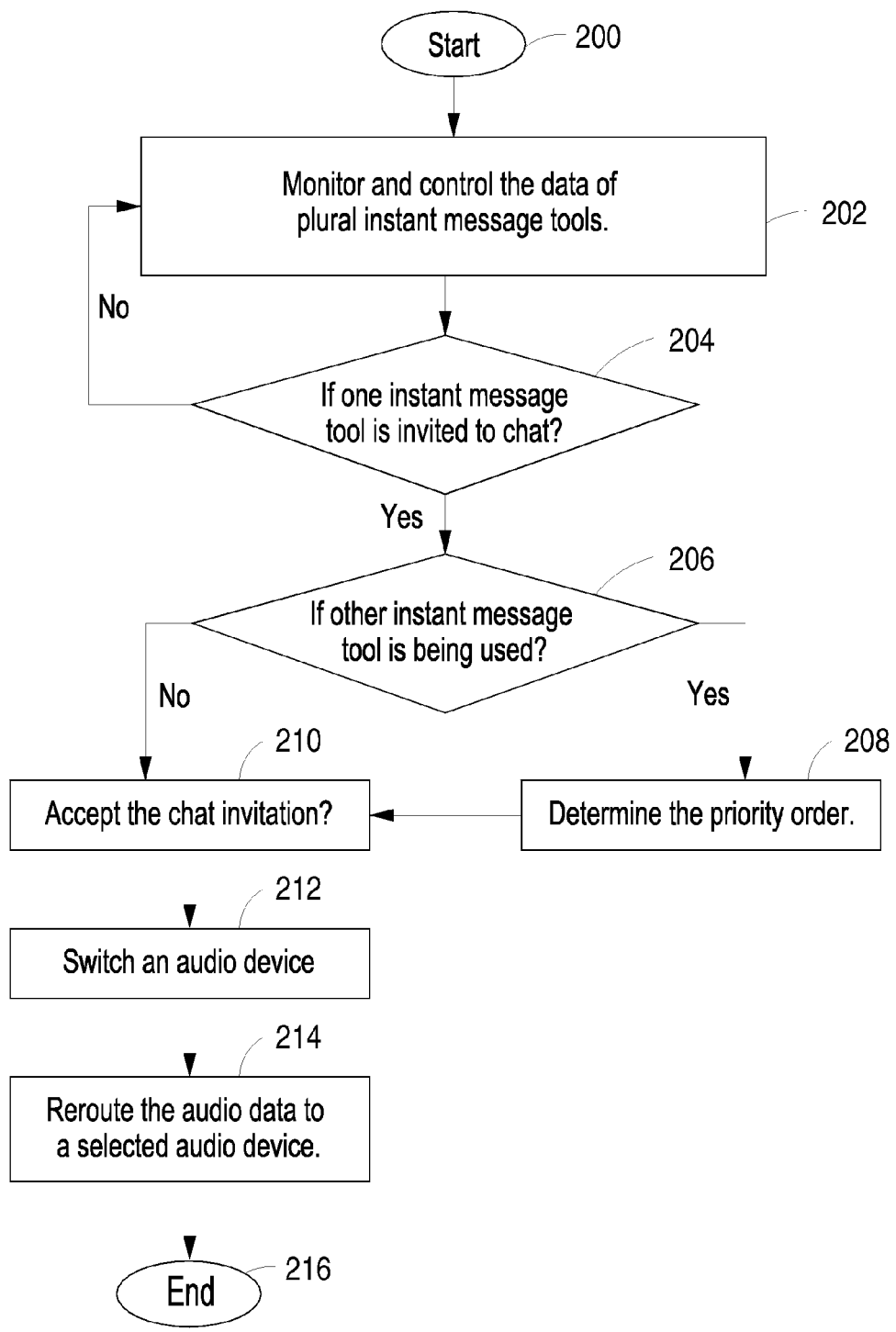
FIG. 2 is a flowchart illustrating an instant message monitoring and controlling method of the present invention.

Hereinafter, an instant message monitoring and controlling method will be illustrated with reference to the flowchart of FIG. 2. This method is applied to the instant message monitoring and controlling system 100 as shown in FIG. 1. The system 100 of FIG. 1 includes an instant message monitoring and controlling module 110 for monitoring and controlling the instant message tools 112, 114 and 116; a user operation interface 120 for defining the selected audio device such as the bluetooth device 132 or the non-bluetooth device 134; a bluetooth module 130 for automatically searching the pairing codes required for connection with the bluetooth device 132; a hot key module 140 actuated to be switched to the desired audio device; and an audio screening module 150 for rerouting the audio data to the selected audio device such as the bluetooth device 132 or the non-bluetooth device 134.

First of all, the instant message monitoring and controlling module 110 monitors and controls the data of the instant message tools 112, 114 and 116 (Step 202). For example, the instant message monitoring and controlling module 110 is responsible for detecting the packets transmitted by the instant message tools 112, 114 and 116, and discriminating whether someone invites to chat or whether either of the instant message tools 112, 114 and 116 is being used to have a chat with the system 100.

If one of the instant message tools 112, 114 and 116 is invited to chat (Step 204), it is determined whether either of the instant message tools 112, 114 and 116 is being used to have a chat with the system 100 (Step 206). For example, if the instant message tool 114 is being used to have a chat with the system 100 and the instant message tool 112 is invited to chat, the instant message monitoring and controlling module 110 will determine the priority order of the instant message tools 112 and 114 (Step 208). If the instant message tool 112 has a higher priority than the instant message tool 114, the chat by the instant message tool 114 will be interrupted and an audio connection between the instant message monitoring and controlling module 110 and the instant message tools 112 will be established. Whereas, if the instant message tool 112 has a lower priority than the instant message tool 114, the chat invitation by the instant message tool 112 is ignored.

Whereas, if no other instant message tool is being used to have a chat with the system 100 (Step 206), the instant message monitoring and controlling module 110 will accept the chat invitation of the instant message tool 114 (Step 210). When the chat is proceeding, the built-in audio device can be switched to the bluetooth device 132 via the user operation interface 120 and/or the hot key module 140 (Step 212).

In a case that the selected audio device is the bluetooth device 132, the bluetooth module 130 will automatically search paring codes required for connection with the bluetooth device 132. For example, if the bluetooth earphone is defined as the bluetooth device 132 via the user operation interface 120, the instant message monitoring and controlling module 110 may actively locate the bluetooth earphone and try to communicate with the bluetooth earphone by searching the paring codes (e.g. 4444, 0000, 1234, etc.) of the general bluetooth earphone. If there is a successful paring, the connection between the instant message monitoring and controlling module 110 and the bluetooth device 132 is established. Under this circumstance, the local user may chat with the remote user by using one of the instant message tools 112, 114 and 116.

In response to the audio device switching instruction, the specified information issued from the system 100 will be received by the audio screening proxy of the audio screening module 150 and then transmitted to the audio screening driver. Under this circumstance, the audio data will be rerouted from the built-in audio device to the selected audio device such as the bluetooth device 132 or the non-bluetooth device 134 (Step 214).

Alternatively, the audio device switching instruction may be transmitted from the bluetooth device 132 to the system 100 through the bluetooth module 130, thereby controlling audio communication operations of the instant message tools 112, 114 and 116. Examples of the audio communication operations include but are not limited to reception of audio chat invitations, call waiting of audio chats, ending chats, having video chats, and so on. For example, after the bluetooth module 130 successfully searches a pairing code and the connection between the instant message monitoring and controlling module 110 and the bluetooth device 132 is established, the bluetooth device 132 can receive the chat invitation sent from the instant message tool 112 when the multifunction key thereof is activated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An instant message monitoring and controlling system comprising:
   an instant message monitoring and controlling module for monitoring and controlling plural instant message tools;
   a user operation interface for defining a bluetooth device therethrough; and
   a bluetooth module for automatically searching pairing codes required for connection with said bluetooth device, wherein one of said instant message tools is communicated with said bluetooth device when said instant message monitoring and controlling module receives data from said instant message tools.

2. The system according to claim 1 wherein said instant message monitoring and controlling module receives data from said instant message tools according to a priority order.

3. The system according to claim 1 further comprising a hot key module for controlling audio communication operations of said instant message tools.

4. The system according to claim 3 wherein said bluetooth device is switched to another bluetooth device or a non-bluetooth device by actuating said hot key module.

5. The system according to claim 1 further comprising an audio screening module for rerouting audio data from said bluetooth device to another bluetooth device or a non-bluetooth device.

6. The system according to claim 1 wherein said instant message monitoring and controlling module receives an instruction issued from said bluetooth device to control audio communication operations of said instant message tools.

7. The system according to claim 1 being included in a notebook computer.

8. An instant message monitoring and controlling system comprising:
an instant message monitoring and controlling module for monitoring and controlling plural instant message tools;
a user operation interface for defining a first audio device therethrough; and
an audio screening module for rerouting audio data from said first audio device to a second audio device when one of said instant message tools is executed to have a voice chat function.

9. The system according to claim 8 wherein the audio data are received and processed according to a priority order of said plurality instant message tools, wherein said priority order is predetermined by said instant message monitoring and controlling module.

10. The system according to claim 8 further comprising a bluetooth module for automatically searching pairing codes required for connection with said second audio device when said second audio device is a bluetooth device.

11. The system according to claim 8 further comprising a hot key module for switching said first audio device to said second audio device.

12. The system according to claim 11 wherein said hot key module controls audio communication operations of said instant message tools.

13. The system according to claim 10 wherein said instant message monitoring and controlling module receives an instruction issued from said bluetooth device to control audio communication operations of said instant message tools.

14. The system according to claim 8 being included in a notebook computer.

15. An instant message monitoring and controlling method, comprising steps of:
monitoring and controlling data of plural instant message tools;
defining a bluetooth device; and
searching pairing codes required for connection with said bluetooth device, wherein one of said instant message tools is communicated with said bluetooth device when the connection is established.

16. The method according to claim 15 further comprising a step of determining a priority order of said plurality instant message tools, and processing audio data from said plurality instant message tools according to said priority order.

17. The method according to claim 15 further comprising a step of controlling audio communication operations of said instant message tools.

18. The method according to claim 15 further comprising a step of selectively switching said bluetooth device to another bluetooth device or a non-bluetooth device.

19. The method according to claim 18 further comprising a step of rerouting the audio data from said bluetooth device to said another bluetooth device or said non-bluetooth device.

20. The method according to claim 15 further comprising a step of receiving an instruction issued from said bluetooth device to control audio communication operations of said instant message tools.

21. The method according to claim 15 further comprising a step of monitoring and controlling statuses of said plural instant message tools.

22. An instant message monitoring and controlling method, comprising steps of:
monitoring and controlling statuses of plural instant message tools;
switching a first audio device to a second audio device; and
rerouting audio data from said first audio device to said second audio device when one of said instant message tools is executed to have a voice chat function.

23. The method according to claim 22 further comprising a step of determining a priority order of said plurality instant message tools, and processing the audio data from said plurality instant message tools according to said priority order.

24. The method according to claim 22 further comprising a step of searching pairing codes required for connection with said second audio device when said second audio device is a bluetooth device.

25. The method according to claim 22 further comprising a step of controlling audio communication operations of said instant message tools.

* * * * *